United States Patent [19]
Den Boef

[11] Patent Number: 5,793,737
[45] Date of Patent: Aug. 11, 1998

[54] METHOD AND APPARATUS FOR WRITING OPTICAL RECORDING MEDIA WITH OPTIMUM VALUE OF WRITE POWER

[75] Inventor: Arie J. Den Boef, Eindhoven, Netherlands

[73] Assignee: U.S. Philips Corporation, New York, N.Y.

[21] Appl. No.: 759,653

[22] Filed: Dec. 6, 1996

[51] Int. Cl.$^6$ ..................................... G11B 7/125
[52] U.S. Cl. ............... 369/116; 369/54; 369/58
[58] Field of Search ................ 369/116, 54, 58, 369/124, 121, 53, 44.34, 32, 44.31, 112, 47, 50, 48, 111

[56] References Cited

U.S. PATENT DOCUMENTS

| | | | |
|---|---|---|---|
| 5,185,733 | 2/1993 | Finkelstein et al. | 369/54 |
| 5,303,217 | 4/1994 | Bakx et al. | 369/48 |
| 5,341,360 | 8/1994 | Johann et al. | 369/116 |

*Primary Examiner*—Ali Neyzari
*Attorney, Agent, or Firm*—Michael E. Belk

[57] ABSTRACT

A method and apparatus for writing information on an optical recording medium by setting an optimum write power for recording information on the optical recording medium. First a series of test patterns is written on the medium, each test pattern being written with a different write power. On reading the test patterns, the modulation of each read signal is determined. The modulations as a function of write power are curve-fitted to an analytic function. The normalised derivative of this function is determined analytically and is used to determine the value of the optimum write power for the medium.

17 Claims, 2 Drawing Sheets

1

METHOD AND APPARATUS FOR WRITING OPTICAL RECORDING MEDIA WITH OPTIMUM VALUE OF WRITE POWER

BACKGROUND OF THE INVENTION

This invention relates to an optical recording apparatus for writing information on an optical recording medium by a radiation beam, and in particular to a method for setting an optimum write power level of the radiation beam, the method includes a first step of writing a series of test patterns on the recording medium, each pattern with a different value of the write power level, a second step of reading the patterns to form corresponding read signals, a third step of deriving a value of a read parameter from each read signal, and a fourth step of curve-fitting the values of the read parameter to a function defining a relation between the write power level and the read parameter. The invention further relates to an apparatus for writing information on an optical recording medium, comprising a radiation source for emitting a radiation beam having a controllable write power level, a control unit for writing a series of test patterns, each pattern with a different value of the write power level. A read unit is provided for reading the patterns and forming corresponding read signals, a first processor for deriving a value of a read parameter from each read signal, and a second processor for curve-fitting the values of the read parameter to a function defining a relation between the write parameter and the read parameter.

A processor may be of an analog or digital type and includes programmable processors and fixed-program processors. The processor may comprise memory means beside an arithmetic unit.

A recording method according to the preamble is known from the U.S. Pat. No. 5,185,733 which is hereby incorporated by reference. In this method, a series of test patterns is written on the medium, each subsequent test pattern being written with an increased write power level. After reading the written patterns, a curve fitting algorithm fits a second order polynomial to the amplitudes of the read signal of each pattern as a function of the write power level. The write power corresponding to the maximum of the polynomial is selected as the optimum write power for subsequently recording information of the medium. The problem of the noise character of the read signal is mitigated by the curve-fitting. A disadvantage of this known method is that the optimum power level, as determined by the method, does not sufficiently take into account variations in properties of recording apparatuses and variations in properties of recording media. Hence, use of this optimum write power may cause unreliable storage of information on the recording medium.

SUMMARY OF THE INVENTION

It is an object of the invention to provide a reliable method for setting the optimum write power in dependence on read signals from test patterns written on a medium and being less affected by noise.

This object is achieved when the method according to the invention is characterized in that it comprises a fifth step of determining a derivative of the function and normalizing the derivative by multiplying it by a factor equal to the value of the write power over the value of the read parameter, and a sixth step of selecting the optimum write power level in dependence on the normalised derivative of the function. The value of the normalised derivative as a function of the write power turns out to be little affected by variations of parameters of the recording apparatus and the recording media. The variations of the apparatus may relate to the distribution of the radiation energy over the cross-section of the radiation beam used for recording, the power calibration of the radiation source. The variations of the media may relate to changes in write sensitivity or reflection over the surface of a medium or between media. If the optimum write power level is selected in dependence on the normalised derivative, then the selected level is suitable for reliable recording on a large variety of recording media by different recording apparatuses. The level may be selected by taking the power level corresponding to a preset value of the normalised derivative.

An alternative embodiment of the method according to the invention is characterised in that it comprises a fifth step of selecting the optimum write power level in dependence on a predetermined value of a derivative of the function normalised by multiplication by a factor equal to the value of the write power over the value of the read parameter.

To achieve a stable curve fitting procedure, the function to be fitted is preferably defined in terms of orthogonal polynomials. Then the value of a coefficient for a polynomial determined by the procedure does not depend on the values of the coefficients determined for the other polynomials.

The polynomials are preferably Legendre polynomials, which require relatively little computing power in the curve fitting procedure because of their mathematical simplicity.

The read parameter is preferably an amplitude of the read signal obtained from the medium, because this amplitude can easily be derived from a radiation detection system intercepting radiation coming from the medium. Moreover, the amplitude is a satisfactory parameter for determining the quality of the recorded signals.

The selection process for the optimum write power may be refined by reading a parameter value from the medium and using this value in selecting the value of the write parameter. The value of the parameter may be characteristic for the specific medium on which it is recorded. The parameter allows an adaptation of the selection process to the characteristics of the medium being scanned. The parameter may be an initial value of or range for the optimum write power level to reduce the range of power levels with which to write the test patterns. The parameter may also be a preset value of the normalised derivative, making it possible to select an optimum write power in dependence on the properties of the medium. In contrast, a preset value fixed by the apparatus does not allow such a choice.

Before making calculations on signal values, the analog signals are preferably converted to digital signals by an analog-to-digital convertor. The derivative may be determined by taking difference values of the fitted function. The values of the function must then be represented by a relatively large number of significant digits, and the calculations must also be performed over this large number of digits in order not to be affected by the additional noise introduced by this method of determining the derivative. The derivative of the function is preferably determined analytically because such a determination introduces hardly any additional noise. The number of significant digits can then be reduced, which reduces the required computing power of the second processor and allows a reduced quality of the analog-to-digital convertors.

In general, the write power levels for the test patterns are chosen in a range around the expected value of the optimum write power level. However, the optimum write power level is often close to the maximum power the radiation source can generate. The range will then be limited by the maximum laser power. This problem can be avoided by selecting a power level from the derivative of the function and subsequently determining the optimum power level by multiplying the power level by a constant larger than one. The test patterns can then be written in a range further removed from the maximum laser power. This has the additional advantage that the measurements are made in a power range where the function and its derivative are removed from their saturation values, which allows a higher accuracy of the determination of the function and its derivative.

A further aspect of the invention relates to the apparatus for writing information on the optical recording medium. This apparatus in according to the invention characterized in that the second processor is operatively connected for deriving a derivative of the function, normalising the derivative by multiplying it by a factor equal to the value of the write power over the value of the read parameter, and for selecting a value of the write parameter in dependence on the normalised derivative.

BRIEF DESCRIPTION OF THE DRAWING

The objects, features and advantages of the invention will be apparent from the following more particular description of preferred embodiments of the invention, as illustrated in the accompanying drawings.

DESCRIPTION OF THE PREFERRED EMBODIMENTS

Figure 1:
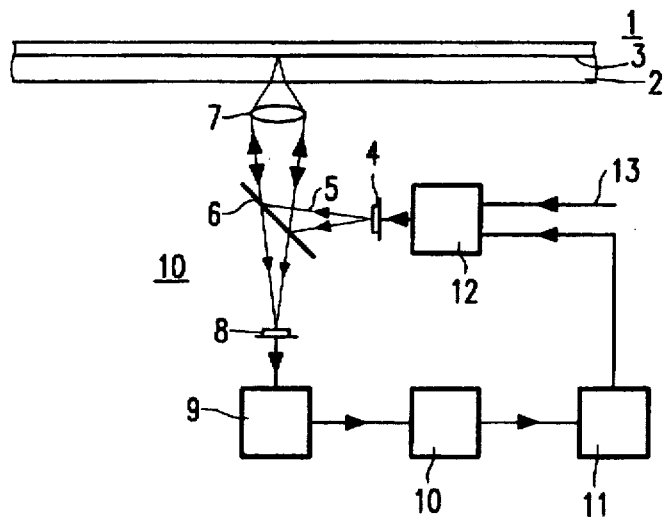
FIG. 1 is a diagram of an optical recording apparatus according to the invention.

FIG. 1 shows an apparatus and an optical recording medium 1 according to the invention. Medium 1 has a transparent substrate 2 and a recording layer 3 arranged on it. The recording layer comprises a material suitable for writing information by means of a radiation beam. The recording may be of e.g. The magneto optical type, the phase-change type, the dye type or may other suitable material. Information may be recorded in the form of optically detectable regions, also called marks, on recording layer 3. The apparatus comprises a radiation source 4, e.g. a semiconductor laser, for emitting a radiation beam 5. The radiation beam is converged on recording layer 3 via a beam splitter 6, an objective lens 7 and substrate 2. The medium may also be air-incident, where the radiation beam is directly incident on recording layer 3 without passing through a substrate. Radiation reflected from medium 1 is converged by objective lens 7 and, after passing through beam splitter 6, falls on a detection system 8, which converts the incident radiation to electric detector signals. The detector signals are input to a circuit 9. The circuit derives several signals from the detector signals, such as a read signal $S_R$ representing the information being read from medium 1. Radiation source, beam splitter 6, objective lens 7, detection system 8 and circuit 9 form together a read unit 10'. The read signal from circuit 9 is processed in a first processor 10 in order to derive signals representing a read parameter from the read signal and necessary for controlling the laser power level. The derived signals are fed into a second processor 11, which processes a series of values of the read parameter and based thereon derives a value for an optimum write power control signal. The write power control signal is connected to a control unit 12. An information signal 13, representing the information to be written on medium 1, is also fed into control unit 12. The output of control unit 12 is connected to radiation source 4. A mark on recording layer 3 may be written by a single radiation pulse, the power of which is determined by the optimum write power level as determined by processor 11. A mark may also be written by a series of radiation pulses of equal or different lengths and a power determined by the optimum write power level.

The actual radiation power emitted by radiation source 4 may be measured by a not-shown detector arranged in an otherwise not-used side lobe of the radiation beam or in radiation reflected off an element in the optical path of the radiation beam. The signal of the detector may be connected directly to processor 11. Alternatively, the signal may be connected to control unit 12, where it may be combined with the peak amplitude of the read signal, which is a measure for the radiation power received at recording layer 3, and subsequently fed into processor 11.

Before writing information on medium 1, the apparatus sets its write power to the optimum value by performing the following procedure. First the apparatus writes a series of test patterns on medium 1. The test patterns should be selected so as to give a desired read signal. If the read parameter to be derived from the read signal is the maximum modulation of the read signal, the test pattern should comprise marks sufficiently long to achieve a maximum modulation of the read signal. When the information is coded according to the so-called EFM modulation, the test patterns preferably comprises the long $I_{L1}$ marks. The test patterns are recorded each with a different write power. Subsequent patterns may be written with a step-wise increased write power under the control of processor 11. The patterns may be written anywhere on the medium. They may also be written in specially provided test areas on the medium.

Figure 2:
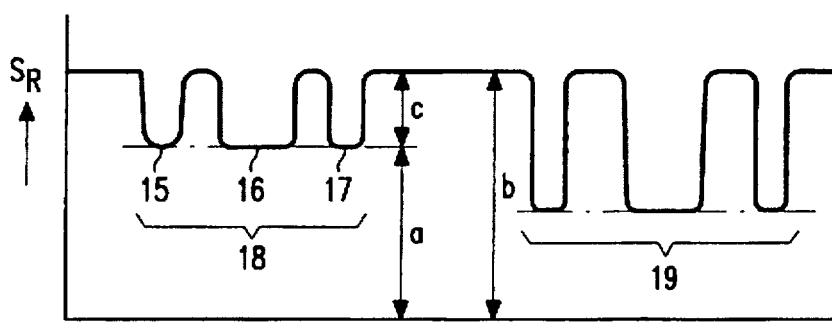
FIG. 2 illustrates read signals from two test patterns.

FIG. 2 shows the read signals 18 and 19 obtained from two patterns written at two different write power levels. The patterns comprise a short mark, a long mark and a short mark, as shown by the signal parts 15, 16 and 17, respectively in both read signal 18 and read signal 19. An actual pattern may comprise a few hundred marks of different or equal lengths.

Processor 10 derives from the read signal $S_R$ a read parameter used for finding the optimum write power. A possible read parameter is the ratio of the lowest amplitude of the signal parts in a read signal, indicated by 'a' in FIG. 2, and the maximum value of the read signal 'b'. A preferred read parameter is the normalised modulation being the ratio of the maximum peak-to-peak value of a read signal 'c' and the maximum value 'b' of the read signal.

Figure 3:
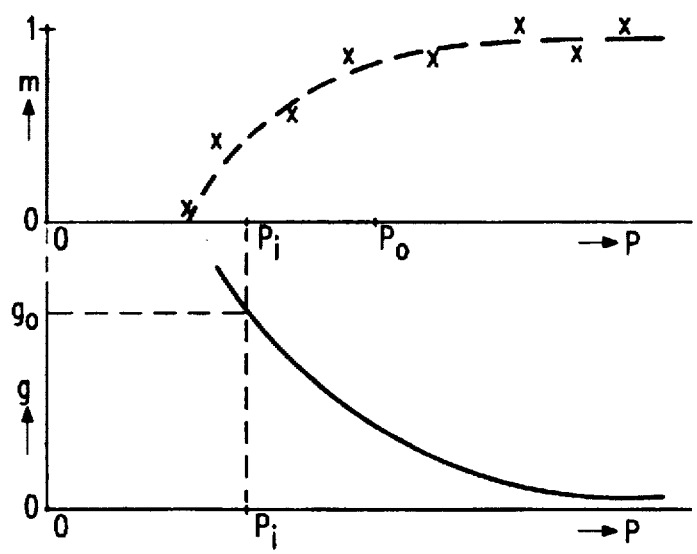
FIG. 3 is a graph showing the measured modulation as a function of write power and its derivative.

After reading the test patterns on medium 1, processor 11 has available a series of pairs of values for the modulation of a pattern and the write power belonging to that pattern. The write powers may be taken from the value of the write power control signal during recording of the test patterns, or from a measurement of the radiation power. FIG. 3 shows schematically the result of reading; the crosses are measured values of the modulation m as a function of the write power P. Processor 11 fits a curve through the measured modulation values in order to obtain an analytic expression for the variation of the modulation as a function of the write power. The curve is indicated in FIG. 3 by a dashed curve. The fitting may be done by the well-known least-squares fitting algorithm.

As a next step, processor 11 calculates analytically a normalised derivative 'g' with respect to the write power of the modulation. The normalised derivative g(P) is equal to the function (dm/dP)P/m. The function g derived from the fitted modulation m in FIG. 3 is shown by the drawn curve.

The processor derives an intermediate write power $P_i$ from the normalised derivative by taking the value of the write power P belonging to a preset value $g_0$, as indicated by the dashed lines in FIG. 3. The value of $g_0$ may be a value set by the manufacturer of the recording apparatus and stored in a memory of the apparatus, or it may be a value stored on the medium to be written and read prior to or during the procedure to set the optimum write power. As a next step, the value of the intermediate power $P_i$ is multiplied by a constant h larger than one, resulting in the optimum write power level $P_0$.

The values of the preset value $g_0$ and the multiplication constant h are determined by the manufacturer of the medium or by the user during initialization of the medium. The value of $g_0$ is set within a range from 0.5 to 2.0. For value higher than 2.0 the normalised derivative looses its predicting value, because the proximity of an asymptote causes the values of P related to $g_0$ to lie closely together on the write power axis. For values of $g_0$ lower than 0.5 the normalised derivative has a small slope, through which small errors in the value of the derivative result in a larger spread of the values of $P_i$ associated with $g_0$. The multiplication constant h is set preferably within a range from 1.00 to 1.35. The optimum write power, $P_0$, equal to (h $P_i$), is in general set to a value near the write power where the modulation m starts saturating. In a preferred method of setting $G_0$ and h, the optimum write power of a specific medium is determined by finding the write power giving the lowest jitter of the read signal for information written on the medium. The information is preferably random information. Next, the normalised derivative dm/dP (P/m) is determined from a written series of test patterns as described above. A value for $P_i$ is selected such that the associated value of $g_0$ lies within the above range, and where the normalised derivative is neither too flat nor too steep. The associated values of h, equal to $P_0/P_i$, and $g_0$ can now be used for all media of this type and for all recording apparatuses.

The value of the normalised derivative turns out to be hardly affected by variations of parameters of the recording apparatus and the recording media. If the optimum write power level is selected in dependence on the normalised derivative, the selected level is suitable for reliable recording on a large variety of recording media by different recording apparatuses. The level may be selected by taking the power level corresponding to a preset value of the normalised derivative. The advantages of the use of the normalised derivative may also be achieved when no curve-fitting is performed. In that case the derivative may be determined from the read parameter versus write power level data by e.g. calculating differences between the measured values. However, omitting the step of curve-fitting will increase the noise in the values of the derivative, thereby making it impossible for some media to use the derivative for setting the optimum write power.

Figure 4:
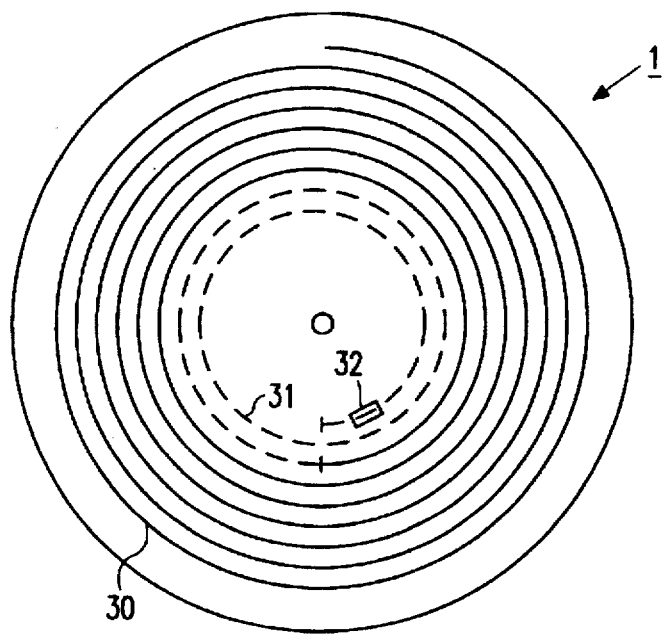
FIG. 4 is a plan view of a recording medium.
Figure 5:
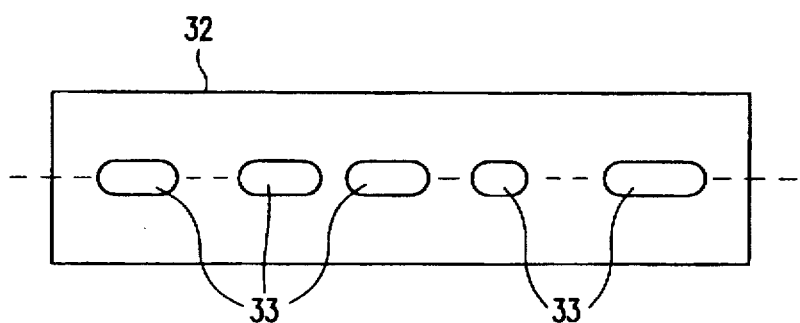
FIG. 5 is a plan view of a pattern of marks in the medium.

The values of $g_0$ and h may be stored in the apparatus, thereby providing medium-independent values of the parameters. Preferably, the value of $g_0$ is stored in the medium, allowing media-dependent values. FIG. 4 shows optically readable recording medium 1, provided with a track 30. The track may be spiral and in the form of, for example, an embossed groove or ridge. The area of the medium is divided into an information recording area 31 for writing user information and a control area 32 for storing information relevant for writing, reading and erasing information on the medium and in general not intended for recording user information. For some types of medium the information in the control is embossed. Control area 32 is marked by dashed track 32 in the Figure. Information recording area 31 is of a type which is subject to change in an optically detectable property when exposed to radiation above a specific write power level. The value of $g_0$ may be stored as a pattern of control information in control area 32 of the medium. When the control area is embossed, the manufacturer of the medium must record the value. Alternatively, the user may record the value in the medium during for instance initialisation of the medium, allowing the recording of a disc-specific value. The value of h may also be recorded like the value of $g_0$. FIG. 5 shows a greatly enlarged portion of track 52 comprising a pattern of marks 33.

The curve to be fitted through the pairs of values (m,P) may be one or more polynomials, which are preferably orthogonal. The curve may then be written as:

$$m(P) = \sum_i a_i f_i(P) \tag{1}$$

where f' (P) is the derivative of function f with respect to the parameter P. The normalised derivative is given in the analytic form $$g(P) = \frac{P \sum_i a_i f_i'(P)}{m(P) \sum_i a_i f_i(P)} \tag{2}$$

The value of $P_i$ can be found from the equation $$g(P_i) = g_0 \tag{3}$$

Depending on the choice of the curve to be fitted, the value of $P_i$ can be found in the form of an analytic expression or as the result of a numerical successive root approximation method such as the regula falsi or Newton's method. The use of an analytic expression, when possible, has the advantage that it always provides the correct root, whereas a successive approximation may divert to an undesired root. When an analytic form of equation (3) can be found, the normalised derivative g need not be determined anymore, but the preset value $g_0$ may be inserted directly into equation (3) for determining the associated value of $P_i$.

A suitable set of orthogonal polynomials $f_i$ are the Legendre polynomials. The three lowest order Legendre polynomials are given by:

$$f_0(P) = 1 \tag{4}$$
$$f_1(P) = P$$
$$f_2(P) = \frac{3}{2} P^2 - \frac{1}{2}$$

Since these polynomials are defined on the interval $-1 < P < +1$, the write power values to be fitted should be scaled according to $$P_s = \frac{2P - (P_{max} + P_{min})}{P_{max} - P_{min}} \tag{5}$$

The scaled write power levels $P_s$ must now be used in the formulae of equation (4). The value of $P_i$ found from equation (3) must be scaled back to the range $P_{min}$, $P_{max}$.

When using a digital processor, the input values of m and P must be converted from an analog value to a digital value by an analog-to-digital convertor. The number of bits of the digital output values can be made to correspond to the noise in the measured values. If, for example, the noise in the values of a parameter is 1% of the maximum value of the parameter, the convertor should be at least 8 bits deep, thereby introducing an additional $1/2^8=1/256$ quantization noise.

If for reason of costs processor 11, in which the above calculations are made, is a small processor, the calculations are preferably performed in an integer format. The values of m and P should therefore be converted from real to integer values. The multiplication constant for this conversion should be large enough not to introduce additional noise and small enough not to too require much computing power. A good guide is to choose the constant such that the noise present in the value of m or P, as determined in the integer representation of the value, is slightly larger than the value corresponding to the least significant bit in the integer representation. The noise in the value includes the above-mentioned quantisation noise. If, for example, the noise in the values of m is 0.5% of the maximum value of m, then a multiplication factor of about 1000 divided by the maximum value of the parameter is reasonable.

Instead of using a series of polynomials for fitting the values of m and P, a single function may also be used. The function must have an asymptote for large values of P, a zero value for a non-fixed value of P>0 and a non-fixed value of the derivative of the function for the value of P where the function is zero. A suitable function is $$f(P) = a_0 - \frac{a_1}{P - a_2} \quad (6)$$

The normalised derivative can be given in an analytic form. Equation (4) reduces to a quadratic equation, allowing to find the root without successive approximation.

Other suitable functions are the arc tangent and the hyperbolic tangent:

$$f(P)=\alpha_0 \text{ arc tan } (\alpha_1 P - \alpha_2) \quad (7)$$

$$f(P)=\alpha_0 \text{ tan h}(\alpha_1 P - \alpha_2) \quad (8)$$

The values of the arc tangent and the hyperbolic tangent may be stored in a lookup table to speed up the calculations.

I claim:

1. A method for writing information on an optical recording medium by setting an optimum write power level of a radiation beam, comprising the following steps:

writing a series of test patterns on the recording medium, each pattern with a different value of the write power level, reading the patterns to form corresponding read signals, deriving a value of a read parameter from each read signal, curve-fitting the values of the read parameter to a function defining a relation between the write power level and the read parameter, determining a derivative of the function and normalising the derivative by multiplying it by a factor equal to the value of the write power over the value of the read parameter, and selecting the optimum write power level dependent upon the normalised derivative of the function.

2. A method for writing information on an optical recording medium by setting an optimum write power level of a radiation beam, comprising:

writing a series of test patterns on the recording medium, each pattern with a different value of the write power level, reading the patterns to form corresponding read signals, deriving a value of a read parameter from each read signal, curve-fitting the values of the read parameter to a function defining a relation between the write power level and the read parameter, selecting the optimum write power level dependent upon a predetermined value of a derivative of the function normalised by multiplication by a factor equal to the value of the write power over the value of the read parameter.

3. The method according to claim 1, wherein the function is defined in terms of orthogonal polynomials.

4. The method according to claim 3, wherein the polynomials are Legendre polynomials.

5. The method according to claim 1, wherein the read a parameter is an amplitude of a read signal.

6. The method according to claim 1, wherein the selecting step includes reading a parameter value from the recording medium and using that value in selecting the value of the write power level.

7. The method according to claim 1, wherein the derivative of the function is determined analytically.

8. The method according to claim 1, wherein the selecting step includes selecting a power level dependent upon the derivative of the function and subsequently determining the optimum power level by multiplying the power level by a constant larger than one.

9. The method according to claim 2, wherein the selecting step includes selecting a power level dependent upon the derivative of the function and subsequently determining the optimum power level by multiplying the power level by a constant larger than one.

10. An apparatus for writing information on an optical recording medium, comprising: a radiation source for emitting a radiation beam having a controllable write power level, a control unit for writing a series of test patterns, each pattern with a different value of the write power level, a read unit for reading the patterns and forming corresponding read signals, a first processor for deriving a value of a read parameter from each read signal, a second processor for curve-fitting the values of the read parameter to a function defining a relation between the write power level and the read parameter, wherein the second processor includes means for deriving a derivative of the function, means for normalising the derivative by multiplying it by a factor equal to the value of the write power over the value of the read parameter, and means for selecting a value of the write power level dependent upon the normalised derivative of the function.

11. The apparatus according to claim 10, wherein the read parameter is an amplitude of a read signal.

12. The method according to claim 2, wherein the function is defined in terms of orthogonal polynomials.

13. The method according to calim 12, wherein the polynomials are Legendre polynomials.

14. The method according to claim 2, wherein the read parameter is an amplitude of a read signal.

15. The apparatus according to claim 10 wherein the function is defined in terms of orthogonal polynomials.

16. The apparatus according to claim 10 wherein the second processor further comprises means for reading a parameter value from the recording medium and using said value in selecting the value of the write power level.

17. The apparatus according to claim 10 wherein the second processor further comprises means for selecting a power level dependent upon the derivative of the function, and means for determining the optimum power level by multiplying the power level by a constant factor larger than 1.

* * * * *